United States Patent
Baek et al.

(10) Patent No.: US 11,836,639 B2
(45) Date of Patent: Dec. 5, 2023

(54) SOURCE CODE AND MODULE RECOMMENDATION SYSTEM, AND MODULE ASSEMBLY

(71) Applicant: LUXROBO CO., LTD., Seoul (KR)

(72) Inventors: Seungmin Baek, Seoul (KR); Seungbae Son, Seoul (KR); Yoonsang Jung, Seoul (KR)

(73) Assignee: LUXROBO CO., LTD., Seoul (KR)

( * ) Notice: Subject to any disclaimer, the term of this patent is extended or adjusted under 35 U.S.C. 154(b) by 813 days.

(21) Appl. No.: 16/640,692

(22) PCT Filed: Sep. 17, 2019

(86) PCT No.: PCT/KR2019/011983
§ 371 (c)(1),
(2) Date: Feb. 20, 2020

(87) PCT Pub. No.: WO2020/060146
PCT Pub. Date: Mar. 26, 2020

(65) Prior Publication Data
US 2021/0142185 A1    May 13, 2021

(30) Foreign Application Priority Data

Sep. 21, 2018 (KR) ........................ 10-2018-0114166

(51) Int. Cl.
*G06F 8/33* (2018.01)
*G06N 3/04* (2023.01)
(Continued)

(52) U.S. Cl.
CPC ................ *G06N 5/04* (2013.01); *G06F 8/36* (2013.01)

(58) Field of Classification Search
CPC .... G06N 5/04; G06N 3/04; G06F 8/36; G06F 8/33; G06F 8/34
See application file for complete search history.

(56) References Cited

U.S. PATENT DOCUMENTS

| 10,771,345 B1* | 9/2020 | Louca ................... H04L 41/082 |
| 2011/0219143 A1* | 9/2011 | Sugisono ............... H04L 45/12 |
| | | 709/241 |

(Continued)

FOREIGN PATENT DOCUMENTS

| KR | 10-2017-0010720 A | 2/2017 |
| KR | 10-2017-0023022 A | 3/2017 |

*Primary Examiner* — Chat C Do
*Assistant Examiner* — Noor Alkhateeb
(74) *Attorney, Agent, or Firm* — Birch, Stewart, Kolasch & Birch, LLP

(57) ABSTRACT

A source code and module recommendation system according to the present invention includes: a module assembly including a control module including a function unit including a topology management unit sensing and generating topology information and a plurality of other modules including a different function unit from the control module; a user terminal connected to the module assembly; and a recommendation server connected to the user terminal through a network, storing topology information of the module assembly, and providing information on a recommended source code to the user terminal based on the topology information, in which the topology information may include a connection ranking representing an order in which the plurality of other modules are connected to the control module and the recommendation server may determine the information on the recommended source code based on the connection ranking and transmit the determined information to the user terminal.

14 Claims, 12 Drawing Sheets

(51) Int. Cl.
  *G06F 8/34* (2018.01)
  *G06N 5/04* (2023.01)
  *G06F 8/36* (2018.01)

(56) References Cited

U.S. PATENT DOCUMENTS

| | | | |
|---|---|---|---|
| 2014/0044121 A1* | 2/2014 | Lee | H04L 45/48 |
| | | | 370/351 |
| 2015/0258435 A1* | 9/2015 | Zhang | A63F 13/235 |
| | | | 463/36 |
| 2015/0378692 A1 | 12/2015 | Dang et al. | |
| 2016/0283548 A1* | 9/2016 | Han | G06Q 50/01 |
| 2016/0283905 A1* | 9/2016 | Lahti | G06Q 10/1053 |
| 2016/0357416 A1* | 12/2016 | Abuduweili | G06F 3/04845 |
| 2017/0331726 A1* | 11/2017 | Lee | H04L 45/02 |
| 2018/0277015 A1* | 9/2018 | Casella | G06K 9/62 |
| 2019/0068434 A1* | 2/2019 | Moreira da Mota | H04L 41/40 |
| 2019/0306083 A1* | 10/2019 | Shih | H04L 49/25 |

\* cited by examiner

[FIG. 1]
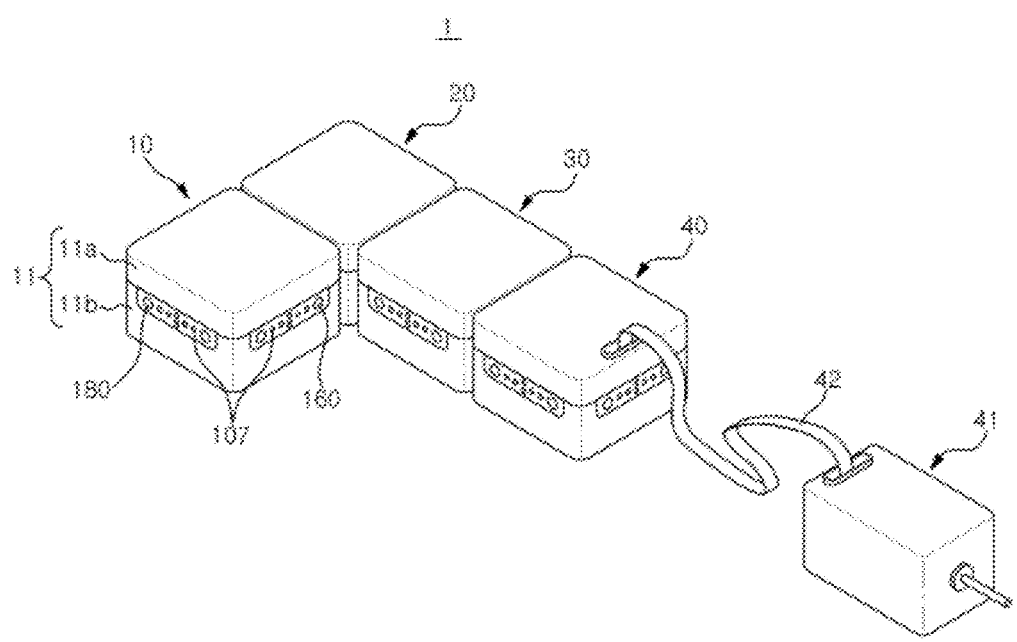

[FIG. 2]
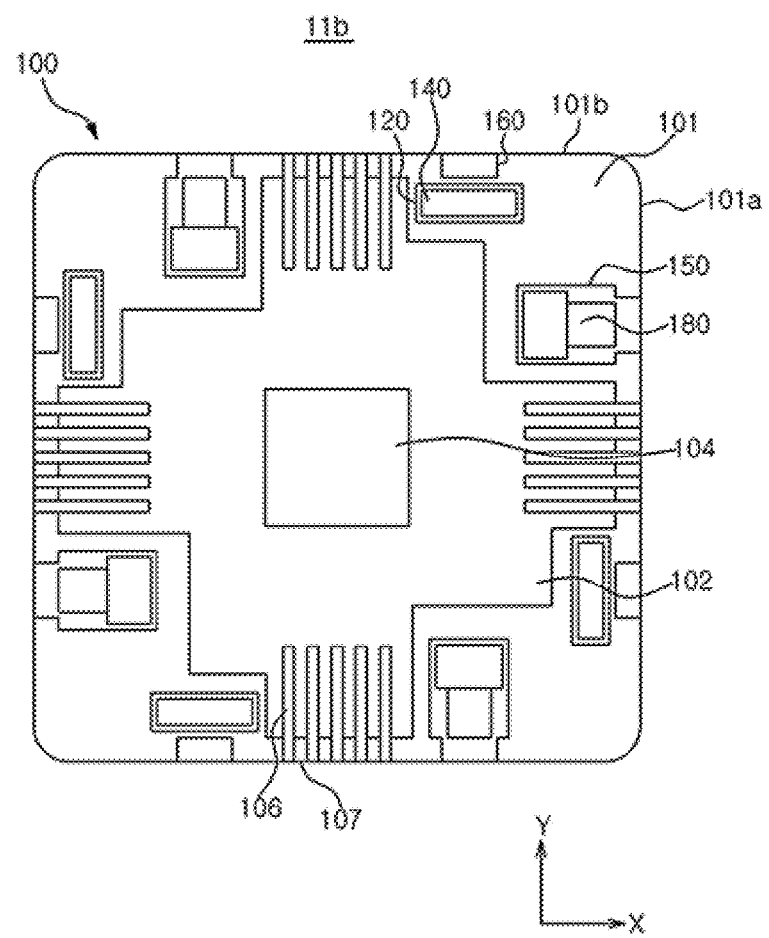

[FIG. 3]
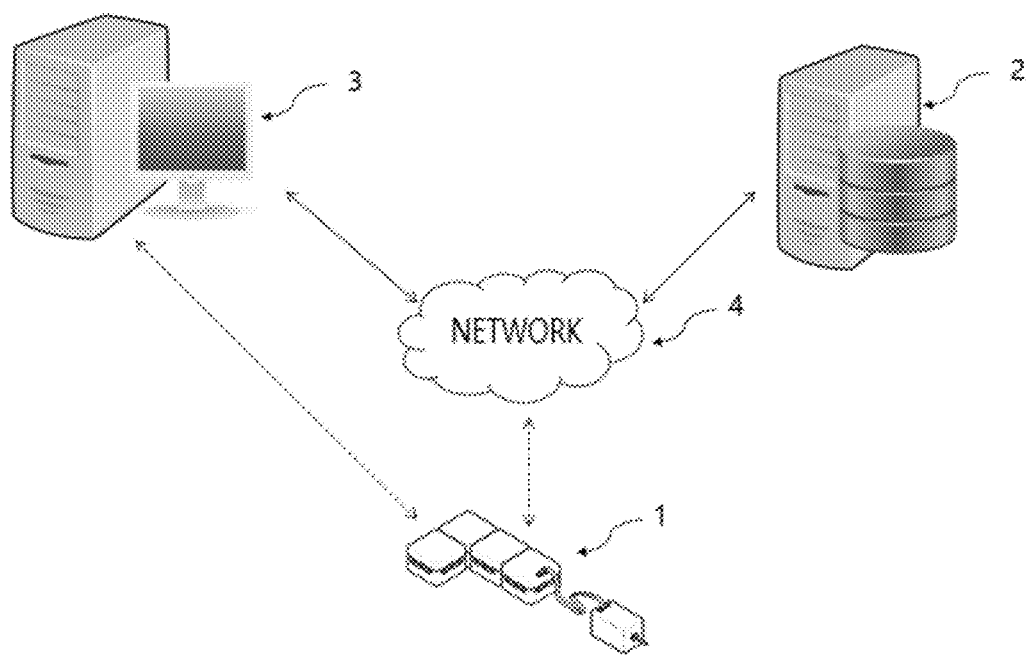

{FIG. 4}
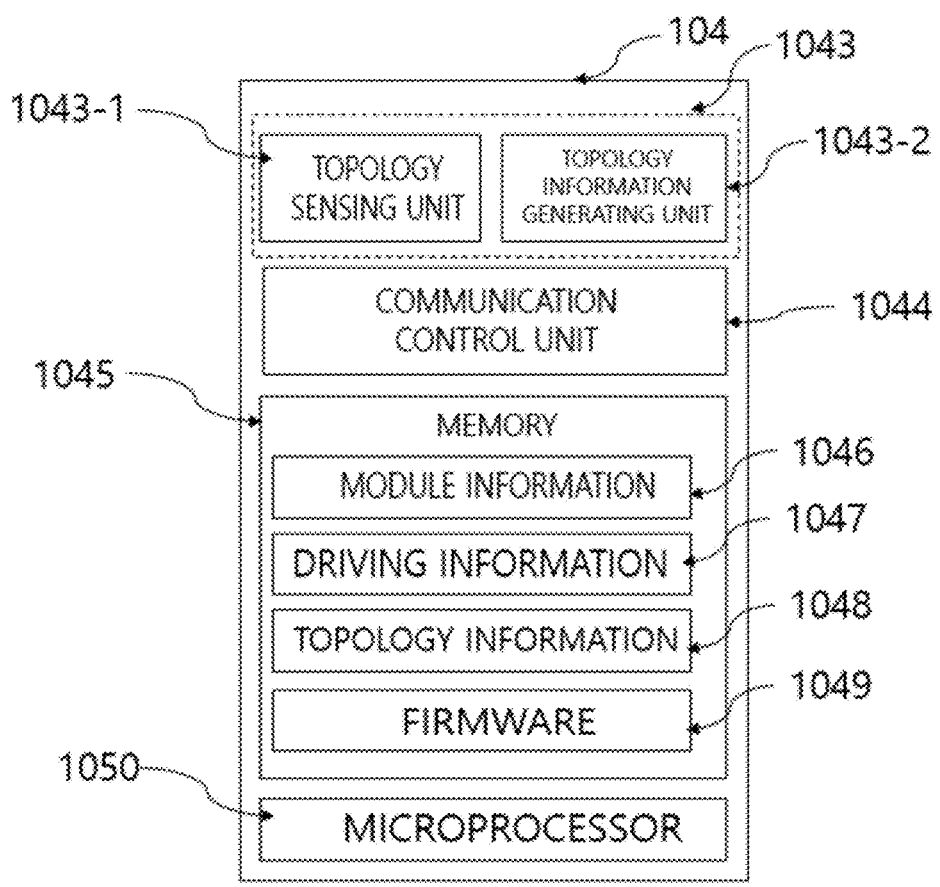

[FIG. 5]
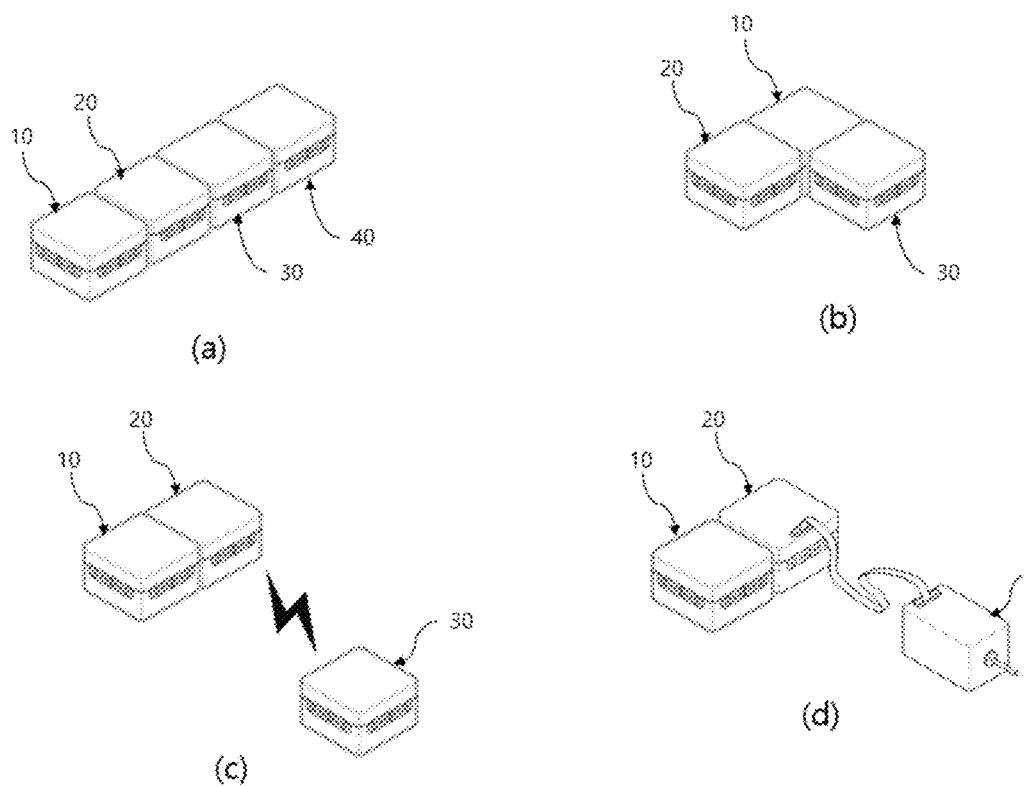

[FIG. 6]

| MODULE ID | STAGE | LOWER CONNECTION MODULE | CONNECTION RANKING | CONNECTION DIRECTION | MODULE CATEGORY |
|---|---|---|---|---|---|
| CONTROL MODULE #1 | 1 | MODULE #1 | 1 | 1 | CONTROL |
| | | CONTROL MODULE #2 | 2 | 2 | |
| | | MODULE #2 | 3 | 3 | |
| MODULE #1 | 2 | CONTROL MODULE #3 | 4 | 3 | NETWORK |
| | | MODULE #4 | 5 | 2 | |
| CONTROL MODULE #2 | 2 | MODULE #5 | 6 | 3 | CONTROL |
| MODULE #2 | 2 | MODULE #6 | | 2 | INPUT |
| CONTROL MODULE #3 | 3 | none | - | - | CONTROL |
| MODULE #4 | 3 | MODULE #7 | 7 | 3 | INPUT |
| MODULE #5 | 3 | none | 8 | - | OUTPUT |
| MODULE #6 | 3 | MODULE #8 | 9 | 2 | OUTPUT |
| MODULE #7 | 4 | none | 10 | - | INPUT |
| MODULE #8 | 4 | none | 11 | - | OUTPUT |

[FIG. 7]
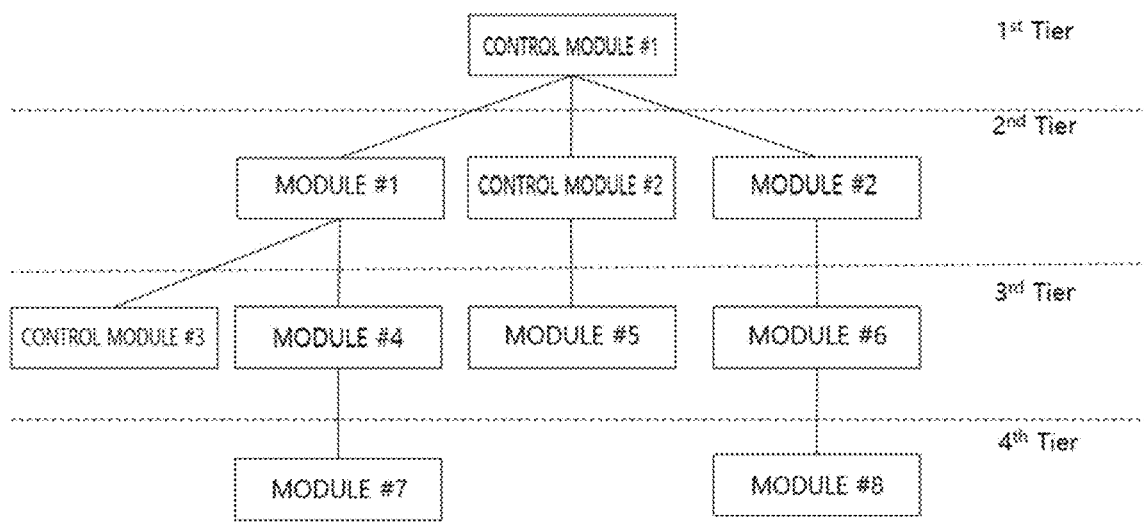

[FIG. 8]
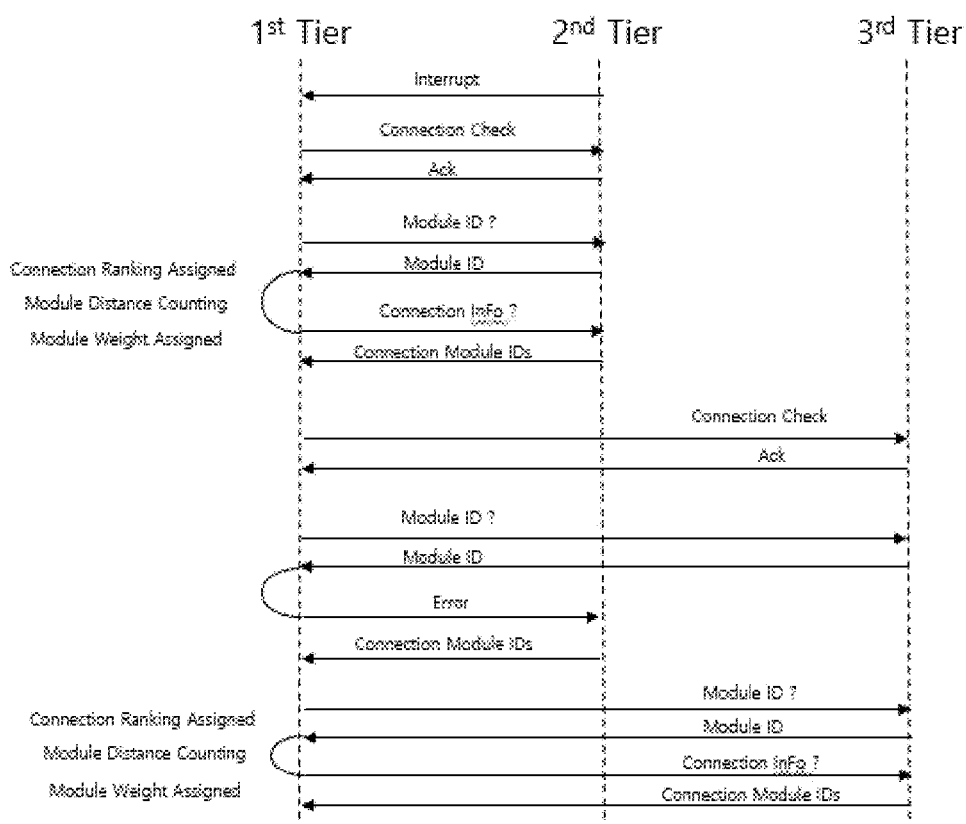

[FIG. 9]
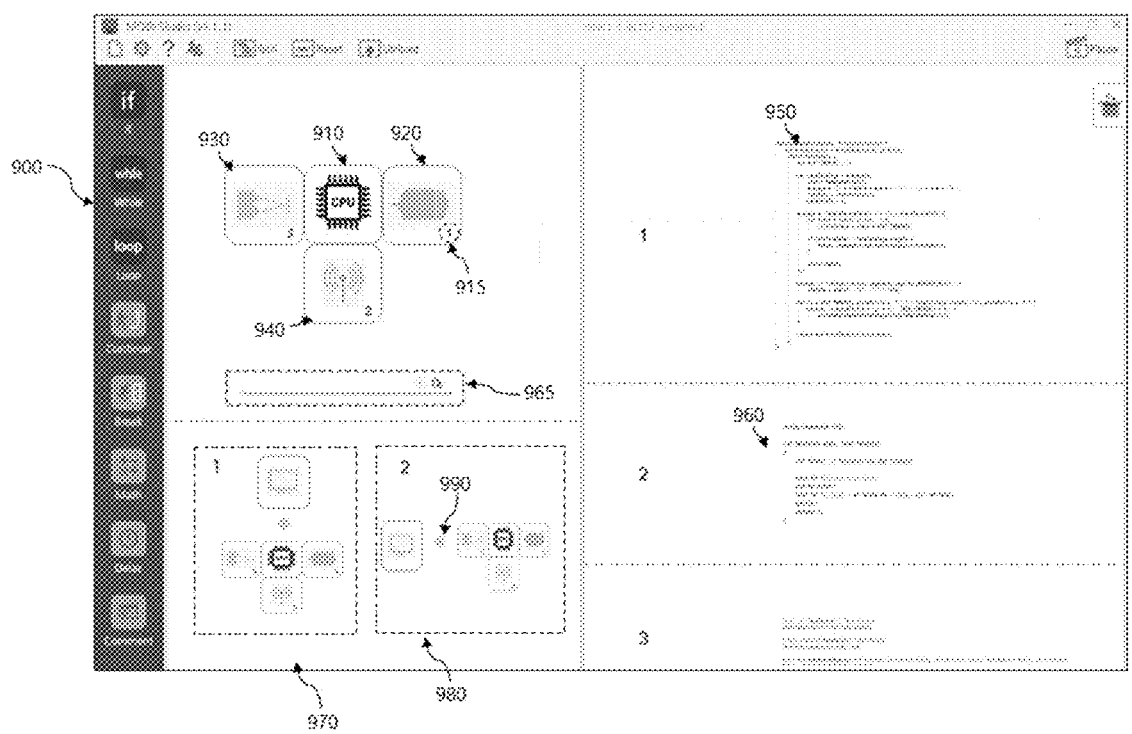

[FIG. 10]
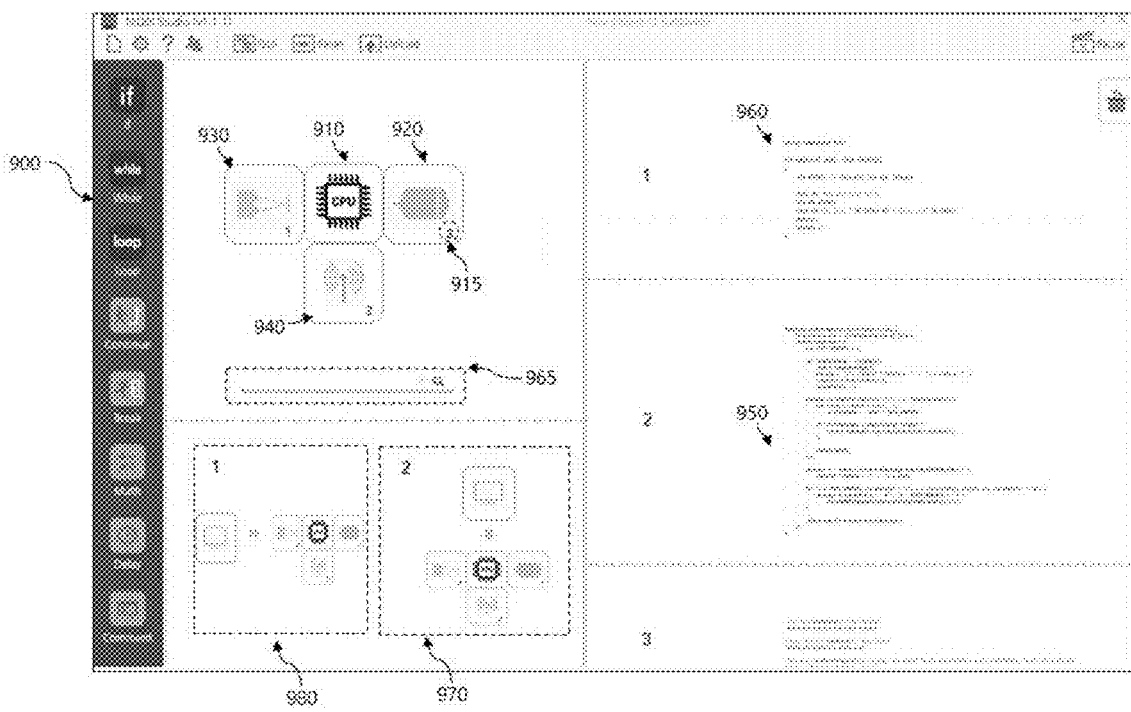

[FIG. 11]
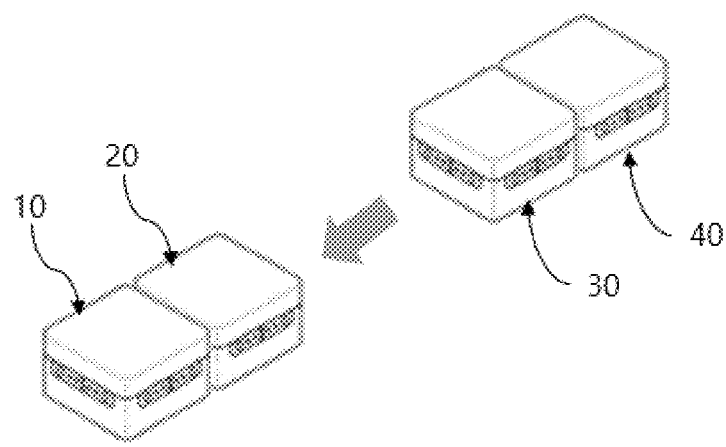

[FIG. 12]
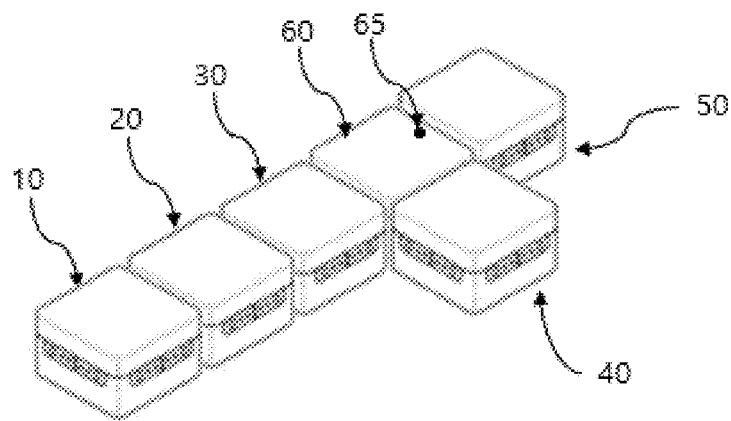

SOURCE CODE AND MODULE RECOMMENDATION SYSTEM, AND MODULE ASSEMBLY

CROSS REFERENCE TO RELATED APPLICATIONS

This application is the National Phase of PCT International Application No. PCT/KR2019/011983, filed on Sep. 17, 2019, which claims priority under 35 U.S.C. 119(a) to Korean Patent Application No. 10-2018-0114166, filed in the Republic of Korea on Sep. 21, 2018, all of these applications are hereby expressly incorporated by reference into the present application.

TECHNICAL FIELD

The present invention relates to a source code, a module recommendation system, and a module assembly, and more particularly, to a source code, a module recommendation system, and a module assembly which may share assembly information of a module assembly in a fabricating tool of a multi-purpose module assembly and allow a user to be easily recommended and search desired assembly information and source code information.

BACKGROUND ART

In recent years, various module based fabricating tools for education, hobby, research, production, etc., have been proposed. Modules included in the fabricating tools may perform specific functions, respectively and are provided to be connected to each other to form a module assembly. In this case, respective modules may be provided to be also electrically connected to each other to transmit/receive energy, signals, data, etc. A user can fabricate a module assembly that performs a specific purpose by assembling modules according to a provided manual or an autonomously created scheme.

As one example, Patent Document 1 (Korean Patent Registration No. 1761596) discloses a module assembly fabricated by assembling various types of modules including a network module, a driving module, a sensor module, and the like. In this case, the module assembly may be utilized for various purposes such as an educational kit which allows students or users may appreciate an operational principle of an electronic device while assembling modules 10, 20, 30, and 40, or a research kit used for fabricating a device for a researcher to perform a specific purpose, and a toy kit which the user is capable of assembling for a hobby.

Various persons including students, normal persons, and the like in addition to the researcher which is a software or hardware specialist use the module assemblies as mentioned above. However, except for the specialist, it may be difficult for the normal persons or students to assemble respective modules and port soft to the assembled module assembly and use the software, and as a result, there may be a restriction on dissemination of the module.

Accordingly, dissemination of a module recommendation system is requested, which allows anyone to assemble the module assembly by easily recognizing various feasibilities of the module assembly and anyone to easily utilize software to be used by automatically generating and recommending the software.

DISCLOSURE

Technical Problem

In order to solve the problem, a module recommendation system according to the present invention may provide a module recommendation system which may share assembly information of a module assembly and allow a user to easily be recommended and search required assembly information.

Accordingly, provided are a module recommendation system and a module assembly in which non-specialists which do not well know hardware or software also easily assemble the module assembly and software to be used is also automatically generated and recommended to allow anyone to easily utilize the module assembly when the module assembly is utilized for educational and personal toys, etc.

Technical Solution

In order to solve the problem, a module recommendation system according to the present invention may provide a module recommendation system which may share assembly information of a module assembly and allow a user to be easily recommend and search required assembly information.

Accordingly, provided are a module recommendation system and a module assembly in which non-specialists which do not well know hardware or software also easily assemble the module assembly and software to be used is also automatically generated and recommended to allow anyone to easily utilize the module assembly when the module assembly is utilized for educational and personal toys, etc.

ADVANTAGEOUS EFFECTS

A module recommendation system according to the present invention may provide a module recommendation system which may share assembly information of a module assembly and allow a user to be easily recommended and search required assembly information.

Accordingly, provided are a module recommendation system and a module assembly in which non-specialists which do not well know hardware or software also easily assemble the module assembly and software to be used is also automatically generated and recommended to allow anyone to easily utilize the module assembly when the module assembly is utilized for educational and personal toys, etc.

In this case, the user may design a new module by referring to a module assembly assembled by other user and a source code for driving the module assembly at the time of assembling the module assembly.

DESCRIPTION OF DRAWINGS

FIG. 1 is a perspective view illustrating a state where a module assembly is assembled according to an embodiment of the present invention.

FIG. 2 is a plan view illustrating an internal structure of a first module of FIG. 1.

FIG. 3 is a block diagram for describing a source code and a module recommendation system according to an embodiment of the present invention.

FIG. 4 is a block diagram for describing a functional unit of a module assembly according to an embodiment of the present invention.

FIG. 5 is a perspective view illustrating a state where a module assembly is assembled according to various embodiments of the present invention.

FIG. 6 is a table for describing topology information according to an embodiment of the present invention.

FIG. 7 is a block diagram for describing topology of a module assembly according to an embodiment of the present invention.

FIG. 8 is a diagram for describing a topology sensing protocol according to an embodiment of the present invention.

FIGS. 9 and 10 are diagrams illustrating a user interface of a developer tool application according to an embodiment of the present invention.

FIG. 11 is a perspective view illustrating a state where a module assembly is assembled according to an embodiment of the present invention.

FIG. 12 is a diagram for describing a semantic module according to an embodiment of the present invention.

BEST MODE

The following contents illustrate only a principle of the present invention. Therefore, those skilled in the art may implement the principle of the present invention and invent various apparatuses included in the concept and the scope of the present invention although not clearly described or illustrated in the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

Further, in the following description, ordinal number expressions such as first, second, etc., are used for describing equal or independent objects and should be appreciated that there is no meaning of main/sub or master/slave in the order.

The above-mentioned objects, features, and advantages will become more obvious from the following detailed description associated with the accompanying drawings. Therefore, those skilled in the art to which the present invention pertains may easily practice a technical idea of the present invention. Hereinafter, the present invention will be described with reference to the accompanying drawings.

FIG. 1 is a perspective view illustrating a state where a module assembly is assembled according to an embodiment of the present invention and FIG. 2 is a plan view illustrating an internal structure of a first module of FIG. 1.

Referring to FIGS. 1 and 2, a module assembly 1 according to an embodiment of the present invention is constituted by a plurality of modules 10, 20, 30, and 40 which may be assembled to each other.

In the embodiment, the module assembly 1 may be defined as a set of one or more modules 10, 20, 30, and 40 which may be assembled to each other or a structure in which the modules 10, 20, 30, and 40 are assembled and is not limited by a purpose, a type, a form, the number of modules, etc. For example, the module assembly 1 may be a part of an educational kit which allows a student or a user to appreciate an operational principle of an electronic device while assembling the modules 10, 20, 30, and 40. Alternatively, the module assembly 1 may be a part of a research kit which a researcher uses for fabricating a device for performing a specific purpose. Further, the module assembly 1 may be a part of a toy kit which the user may assemble for a hobby.

For easiness of description, in the embodiment, an example in which the module assembly 1 is constituted by four modules 10, 20, 30, and 40 as illustrated in FIG. 1 is described and the module assembly 1 will be referred to as a first module 10, a second module 20, a third module 30, and a fourth module 40, respectively.

Moreover, in the embodiment, the modules 10, 20, 30, and 40 may be defined as objects configured to transmit and receive a signal, data, or electrical energy (hereinafter, an 'electrical signal') represented as a change in voltage or current to and from another module or an external device. The modules 10, 20, 30, and 40 include a central processing unit (CPU), a memory, a power supply, etc., or a sensing means, a processing means, a driving means, etc., which is operable by being controlled by another module to be independently driven, respectively. Further, the respective modules 10, 20, 30, and 40 may be configured to independently perform specific functions or perform specific functions by interaction with another module. When the modules 10, 20, 30, and 40 include the central processing unit, firmware may be installed for each module.

The first module 10 to the fourth module 40 may be, for example, an infrared sensor module which may receive an infrared signal from a remote controller, etc., a wireless communication module which may wirelessly communicate with a smart phone, etc., and a driving module such as a gyroscope sensor module or a motor 41. Further, the first module 10 to fourth module 40 may be connected to an external driving device 41 by a cable 42. In this case, the module assembly 1 may be a device that selectively actuates the motor 41 by receiving the signal of the remote controller or the smart phone. A configuration of the module assembly 1 is just one example and the respective modules may be provided to perform an arbitrary function independently or through interlocking with another module.

The modules 10, 20, 30, and 40 may be a cube having a polygonal pillar shape having a plurality of lateral surfaces which may be in face contact with another module. Here, it should be appreciated that face contact does not mean only that all dimensions of lateral surfaces contact each other and should be appreciated as a meaning including a case where only some of the lateral surfaces contact and the lateral surface of any one module and the lateral surface of another module partially contact each other while facing each other.

In the embodiment, it is illustrated as an example that all of the modules 10, 20, 30, and 40 have a plane having a square shape having the same size. That is, in the embodiment, the modules 10, 20, 30, and 40 have four lateral surfaces. Further, in the embodiment, it is described as an example that heights of the modules 10, 20, 30, and 40 are all formed to be the same as each other, and as a result, all of the modules 10, 20, 30, and 40 are rectangular parallelepipeds having the same size.

As another embodiment, the modules 10, 20, 30, and 40 may be formed in polygonal pillar shapes including a regular triangular shape, a rectangular shape, a right pentagonal shape, and the like on a plane and in particular, formed in a right polygonal shape. Some modules 10, 20, 30, and 40 may have different stereoscopic shapes. Further, some of the modules 10, 20, 30, and 40 may have various stereoscopic shapes including a cone, a polyhedron, and the like.

Here, the first module 10 may include a housing 11 forming an exterior, a terminal 107 which is exposed to the lateral surface of the housing 11 to transfer or receive the electrical signal to another connected module, a pin installation portion 150 where a pin 180 which selectively protrudes to the outside of housing 11 is provided, and a pin receiving portion 160 into which a pin of another module is inserted.

The housing 11 may be, for example, a case formed in a rectangular parallelepiped shape. As illustrated in FIG. 1, the housing 11 may be provided in a form in which an upper case 11a and a lower case 11b are coupled to each other. In a method for configuring the housing 11, the upper case 11a and the lower case 11b may be integrally formed or divided into more parts and assembled as necessary.

The terminal 107 may transfer the electrical signal to another connected module or receive the electrical signal from another module and as one example, may receive the electrical signal from a substrate 102 provided in the housing 11 and transfer the electrical signal to the terminal of another module which contacts the terminal 107. The terminal 107 may have multiple contact points or connection pins and may have various shapes according to a transferring method of the electrical signal, a standardized specification, and the like. Such a terminal 107 may be disposed on one lateral surface of the housing 11 by forming one set with the pin 180, the pin installation portion 150, and the pin receiving portion 160. Specifically, the terminal 107 may be disposed between the pin 180 and the pin receiving portion 160 and may contact the terminal disposed between the pin and the pin receiving portion of another module.

In the embodiment, it is described as an example that the terminal 107 is provided on all lateral surfaces of the housing 11, but there may be a lateral surface without the terminal 107 in some embodiments.

Referring to FIG. 2, the lower case 11b may include a frame 100 forming the external and the internal structure, a substrate 102 provided inside the frame 100, and a functional unit 104 installed on the substrate 102.

The frame 100 as a structure that configures a part or the entirety of the housing 11 may form a space and a structure for forming the exterior of a part or the entirety of the housing 11 and provide a space and a structure for installing various components therein. In the embodiment, it is described as an example that the frame 100 forms the lower case 11b of the housing H, but the scope of the present invention is not limited thereto. Further, in the embodiment, the frame 100 is formed in a rectangular shape and has four corners 101.

The functional unit 104 for implementing the function of the first module 10 may be mounted on the substrate 102 and may be fixedly installed in an inner space center of the frame 100. The functional unit 104 may include, for example, a microprocessor and in this case, when the first module 10 is driven by independent firmware, the functional unit 104 may be provided in order to control the first module 10. As another example, when the first module 10 is an infrared sensor module, the functional unit 104 may include required devices such as an infrared sensor and an analog digital converter (ADC) required for processing a value sensed by the infrared sensor and an interface required for communication with another module or external hardware, e.g., a communication interface such as I2C, UART, or USB.

The types of modules 10 to 40 of the present invention are determined according to the function of the functional unit 104. For example, the functional unit 104 may include the microprocessor and the memory and becomes a control module when the functional unit 104 includes an OS or firmware capable of other units. Alternatively, the functional unit 104 becomes the sensor module when being capable of transferring the sensed value of the sensor to another module or the external device. Alternatively, the functional unit 104 may become a communication module when being capable of transmitting the electrical signal to another external device through the wired/wireless communication device by receiving the electrical signal from another module while including various wired/wireless communication devices including NB-IOT, LTE, LoRa, WiFi, Bluetooth, USB, a cable modem, etc. Alternatively, the functional unit 104 may become a driving module when being actuatable while including various actuator including the motor and the like and actuator control circuits. Other more detailed structures and combinations of the modules of the present invention are disclosed in detail in Korean Patent Registration No. 10-1761596 and included in the specification of the present invention by reference.

Hereinafter, a source code and a module assembly recommendation system will be described with reference to FIG. 3, which may assemble the module assembly 1 having the above-described structure and design a new module by referring to a module assembly 1 assembled by other user and a source code for driving the module assembly 1 at the time of preparing the source code for driving the assembled module assembly. FIG. 3 is a block diagram for describing a source code and a module assembly recommendation system according to an embodiment of the present invention. Referring to FIG. 3, the module assembly recommendation system according to an embodiment of the present invention may include a module assembly 1, a recommendation server 2, and a user terminal 3.

In this case, the recommendation server 2 and the user terminal 3 may be connected to each other through a network 4. In the embodiment, an example is described in which the network 4 is implemented by the Internet. However, the present invention is not limited thereto and those skilled in the art may implement a connection between the recommendation server 2 and the user terminal 3 through various networks.

The recommendation server 2 may receive topology information from the user terminal 3 or the module assembly 1 through the network and store the topology information as big data. In this case, the recommendation server 2 may recommend an available source code and additional or replaceable/additional module information based on the topology information. In this case, the additional or replaceable module information means information on a module that may perform an additional operation as compared with a current configuration by additionally attaching the module or may be replaced in the current configuration of the module assembly 1. In the embodiment of the present invention, the additional or replaceable module information and the source code related to the model assembly of the corresponding combination may be recommended and downloaded by the recommendation server 2.

In this case, when the recommendation server 2 provides a plurality of additional or replaceable module combination information and related source codes, the user terminal 3 may provide an interface capable of selecting preferred module information and source code. A detailed process for source code and module recommendation will be described later.

Meanwhile, the module assembly 1 may be connected to the user terminal 3 through a wired communication means such as USB, RS-232, IEEE1394, etc., or connected to the user terminal 3 through a wireless communication means such as WiFi or Bluetooth. Alternatively, the module assembly 1 may be connected to the user terminal 3 through the network.

In the description of the functional unit 104, the functions of the modules 10 to 40 are determined according to the configuration of the functional unit 104 as described above. In this case, for convenience, the functional unit 104 is described after assuming that the module 10 is the control module. In this case, the control module 10 may have the same configuration as that illustrated in FIG. 4.

Referring to FIG. 4, the functional unit 104 of the control module 10 may include a topology management unit 1043, a communication control unit 1044, a memory 1045, and a microprocessor 1050.

Here, the topology management unit 1043 performs a function to determine the topology by executing a protocol for sensing a connection structure (topology) of the module assembly 1. More specifically, the topology management unit 1043 may include a topology sensing unit 1043-1 and a topology information generating unit 1043-2.

The topology sensing unit 1043-1 is a hardware and/or software component which may include a topology sensing protocol and sense the topology of connected modules. For example, referring to FIG. 5, the topology sensing unit 1043-1 of the embodiment may sense a connection ranking connected to the module assembly 1 based on the control module 10 and determine tiers (1st tier to 4th tier) of the corresponding module according to the distance from the control module 10. A detailed sensing protocol of the topology sensing unit 1043-1 will be described later.

In this case, the topology sensing unit 1043-1 determines the connection ranking according to a connection order. For example, in FIG. 5(a), when the modules 20, 30, and 40 are sequentially connected to the control module 10, connection ranking 1, connection ranking 2, and connection ranking 3 are sequentially assigned to the module 20, the module 30, and the module 40. In this case, when the modules 30 and 40 are first coupled before being connected to the control module 10, the modules 30 and 40 may be designated as a module group and then the same connection ranking may be assigned. In this case, connection ranking 1 may be assigned to the module 20 and connection ranking 2 may be assigned to the modules 30 and 40.

Meanwhile, in a case illustrated in FIG. 5(b), each of the modules 20 and 30 is coupled to the control module 10 and in this case, the connection ranking is assigned according to an actual coupling order. For example, when the module 20 is first coupled to the control module 10, the connection ranking of the module 20 becomes 1 and the connection ranking of the module 30 becomes 2.

Meanwhile, the distance between the modules is determined by counting modules connected on a shortest path from the control module 10 up to the corresponding module. For example, in the connection illustrated in FIG. 5(a), since other modules 30, 20, and 40 are sequentially connected from the control module 10, the distance of the module 20 may be 1, the distance of the module 30 may be 2, and the distance of the module 40 may be 3. In this case, since the distance between the modules is determined according to the module counting on a shortest distance, the distances of the modules 20 and 30 from the control module 10 may become 1 in the connection illustrated in FIG. 5(b). Meanwhile, FIGS. 5(c) and 5(d) are basically diagrams illustrating the connection illustrated in FIG. 5(b), but a case where the modules 20 and 30 are connected wiredly or wirelessly. In this case, the case where the modules 20 and 30 are connected wirelessly may mean, for example, a case where Bluetooth pairing is performed or ports are logically connected on the network. In this case, the distances of the modules 20 and 30 from the control module 10 may be 1 similarly to FIG. 5(b).

The topology information generating unit 1043-2 may determine connection topology of the module and write the determined connection topology to the memory as illustrated in FIG. 6 according to the sensed topology. FIG. 6 illustrates topology generated by sensing the topology illustrated in FIG. 7. The topology information generating unit 1043-2 determines the topology based on module topology information 1048 including the ID of each module, the connection ranking, the lower connection module information, module category information, and tier information. Here, detailed contents of the module topology information 1048 will be described later.

However, when another control module as the lower connection module of the control module 10 is connected (control module #2 or control module #3 of FIG. 6), the control module connected to another module as a main control module first becomes a control module of tier 1. That is, when control module #1 is first connected to module #1 or module #2 which is another module, if control module #2 is singly connected to control module #1, control module #1 may become the main control unit. Alternatively, a separate priority may be stored in the control module and a control module having a high priority may be set as the main control module and a control module having a lower priority may be set as a sub control module. Alternatively, the developer tool application 900 executed on the user terminal 3 may designate the main control module or the sub control module.

Meanwhile, the communication control unit 1044 may control communication with an external device and communication between the modules. The communication with the external device may include various wired/wireless communication including NB-IOT, LTE. LoRa, WiFi, Bluetooth, USB, a cable modem, etc. Meanwhile, the communication between the modules may perform inter-module communication by using various internal communication means including UART, I2C, LIN, CAN, etc. The communication control unit 1044 may include various wired/wireless communication means or the communication means between the modules and perform communication by a scheme of controlling a separate network module when being connected to the separate network module.

The memory 1045 includes various information required for the operation of the module assembly 1, software, and various information for the topology of the connected module, and for example, the memory 1045 may include module information 1046, driving information 1047, topology information 1048, and firmware 1049.

The module information 1046 may include the module ID, module category, functional information, and meta information. The module ID 1046 may be a module unique identifier such as a Universally Unique identifier (UUID). Alternatively, the module ID 1046 may become a temporary ID assigned during combination in the control module 10.

In this case, the module category is a concept that classifies a plurality of modules, i.e., modules having a similar function to a higher concept based on functions in order to assist finding replaceable modules. For example, modules for inputting the electrical signal, such as a sensor, a key, a microphone, etc., may include 'input' and an actuator, a display, an LED, etc., may include 'output' or the microprocessor and in the case of a module capable of executing a program ported by the user, a network module, a battery module, or a weight display module, 'setup', etc., may be an example of the module category.

Further, the module category may additionally have lower module category while maintaining a hierarchical structure for finer classification. For example, the module category may have a module category system shown in the following table.

TABLE 1

| Higher category | Lower category | Module |
| --- | --- | --- |
| Setup | Control | Control module |
| | Network | Bluetooth module |
| | | Wi-Fi mdoule |
| | | Zigbee module |
| | | Zigbee module |
| | Battery | Battery module |
| | Semantic module | Semantic module |
| Input | Sensor | Acceleration sensor |
| | | Microphone module |
| | | Camera module |
| | | Air quality measurement module |
| | | Color sensor |
| | | Touch sensor |
| | | Hall sensor |
| | | Infrared sensor |
| | | GPS |
| | | Gyroscope |
| | | Ultrasonic |
| | Key input | Button |
| | | keyboard |
| Output | Visual output | Display |
| | | LED |
| | Driving | Actuator driving module |
| | | Motor control module |
| | Actuator | Motor |
| | | Linear actuator |
| | | Solenoid |
| | Voice output | Speaker |
| | | Buzzer |
| | Others | Wheel |
| | | Motion conversion module (rotary motion -> linear motion) |
| | | Simple connection module |

Meanwhile, the functional information represents a detailed function of the module and for example, the control module, the infrared sensor module, a switch module, a power supply module, and the network module may become the detailed function. In this case, the function of the module may vary depending on the configuration of the functional unit 104 in each module. The meta information as other information requiring search of the module and the source code may become, for example, a detailed device name such as a fan and may be related keywords associated with the fan, such as 'breeze' or 'cool'. The module driving information 1047 is a driver for driving each module. The driving information may be downloaded from the recommendation server or the developer tool application on the Internet when the driving information is stored in the corresponding module and then provided to the control module 10 at the time of connecting the module or when the control module 10 provides the topology information to the server or the developer tool application 900 included in the user terminal through the Internet. The control module 10 may drive the module assembly 1 based on the module driving information. Meanwhile, the module topology information 1048 as the topology information collected by the control module 10 will be described in detail with reference to FIGS. 6 and 7.

FIG. 7 exemplarily illustrates the topology information of the module assembly 1 having the topology of FIG. 6.

According to FIG. 6, the module topology information 1048 may basically include unique information (module ID) 1048-1 of the modules in the module assembly 1, tier information 1048-2, lower connection module information 1048-3, a connection ranking 1048-4, and module category 1048-6. The module topology information 1048 may additionally include a connection direction 1048-5.

The module unique information 1048-1 represents module IDs 1046 of connected modules included in the module assembly. In this case, the module unique information 1048-1 may be a module unique identifier such as a Universally Unique Identifier (UUID) and may be a temporary ID assigned during connection in the control module 10.

The tier information 1048-2 means a distance from the control module 10 and is determined by counting modules connected on a shortest path from the control module 10 up to the corresponding module. However, a module attached to a semantic module among the modules, by assuming the semantic module as the control module 10, the tier information 1048-2 may be determined as a distance from the semantic module or (tier designed in the semantic module)+ (distance from the semantic module)−1. Alternatively, when the module is attached to the semantic module, a large weight is assigned and importance of the module attached to the semantic module may be emphasized.

In a case where it is difficult to directly connect the semantic module to the control module 10, such as influencing the size of the module or another module, the semantic module is a module for displaying, by hardware, that the semantic module is a module which is important in source code recommendation or module recommendation in a developer program.

For example, when the user intends to manufacture the model assembly serving as a mini car by assembling the module, a motor module or a wheel module has an important meaning, but is further from the control module 10 due to the size of the wheel, etc., and as a result, it may be difficult that the motor module or the wheel module has a meaning. In this case, when the motor module or the wheel module is connected to the semantic module, an intention of the user is reflected on the topology, and as a result, recommendation of the source code or the added or replaced module may be closer to the intention of the user.

FIG. 12 is a diagram for describing a case where the semantic module 60 is attached in the module assembly according to an embodiment of the present invention. In this case, in general, the semantic module 50 is attached to the control module 10 through the modules 20 and 30 and the modules 40 and 50 are attached to the control module 10 through the semantic module 60. In this case, a high weight may be assigned to the modules 40 and 50 attached to the semantic module 60 or high-tier information (closer to the control module 10) may be assigned to the modules 40 and 50 attached to the semantic module 60. In this case, the semantic module 60 may include an important direction display 65. When the important direction display 65 is included in the semantic module 60, a high weight or high-tier information may be assigned only to the module 50 attached in a displayed direction.

The lower connection module information 1048-3 represents module unique information of a module having a lower tier (further from the control module 10) than the corresponding module. By default, when each module stores information of modules connected to the corresponding module and is connected to the control module 10, each module may provide to the control module 10 information of a module connected to a lower priority.

The connection ranking 1048-4 which represents an order to access the control module 10 represents information which becomes a basis when the recommendation server 2 recommends the source code and the module. Since the method for determining the connection ranking 1048-4 is described in the description part for FIG. 5, a description of a common part will be omitted. When a module group constituted by a plurality of modules which is already combined is combined to the control module 10, the same common connection ranking 1048-7 may be assigned to the module group.

The connection direction 1048-5 as additional information represents information indicating to which port the lower connection module and the higher connection module are physically connected. For example, when there are a communication module and a gyroscope sensor module, an electromagnetic wave of the communication module may influence sensing of the gyroscope sensor module, and as a result, the communication module and the gyroscope sensor module may be mutually disposed at locations not influencing each other as possible based on the connection direction 1048-4. In this case, the connection direction information and the tier information may be utilized.

Last, the module category 1048-6 represents information to classify the modules according to the function of the module. For example, various sensors including a microphone, a temperature sensor, a gyroscope sensor, an infrared sensor, an ultrasonic sensor, and the like and modules that collects input electrical signals, such as a dial, a button, a keyboard, and the like may be classified to 'input'. Alternatively, an actuator such as the motor, a light emitting diode (LED), a liquid crystal display device, and a speaker may be classified to 'output'. Further, various networks modules (LTE, Bluetooth, etc.) may be classified to 'communication'. Further, a module which may include the microprocessor and execute an application programmed by the user terminal 3 may be classified to 'control'. When recommending the module, the server may determine whether the recommended module is a replaceable module or an addable module based on the category information.

The topology information may be utilized as follows. Hereinafter, referring to FIGS. 9 and 10, an interface and an algorithm in which the server recommends the source code and the module based on the topology information will be described in detail.

When the topology information of the module assembly 1 connected to the user terminal 3 is provided to the user terminal 3, the developer tool application 900 may provide current components 910 to 940, recommended source codes 950 and 960, and additional ore replaceable recommended modules 970 and 980. In this case, preferably, the developer tool application 900 may provide the recommended modules 970 and 980 together with a recommended installation location 990.

The recommended source codes 950 and 960, the recommended modules 970 and 980, and the recommended installation location 990 are provided from the recommendation server 2. The recommendation server 2 stores a module assembly topology history already used by the existing users and a source code corresponding thereto and provides recommendation for the source code, the additional component, and the installation location based on the topology information of the module assembly 1 of the current user.

In this case, the recommendation server 2 may perform recommendation by determining the recommended source code and module and the recommendation order according to the connection ranking 915, the tier information, the module category, a keyword 965 input by the user, and the meta information in the topology information.

First, when an embodiment for the connection ranking is described, for example, it can be seen that in FIG. 9, the module assembly 1 is assembled in the order of the control module 910, the actuator module 920, the network module 940, and the infrared module 930, but in FIG. 10, the module assembly 1 is assembled in the order of the control module 910, the infrared module 930, the network module 940, and the actuator module 920 (see the connection ranking 915). In this case, since FIGS. 9 and 10 are the same as each other in the combination configuration of the module, but different from each other in the connection ranking of the module, the recommendation order of the source code is different, and as a result, in FIG. 9, a source code 950 is recommend first, but in FIG. 10, a source code 960 is recommended first.

Further, since FIGS. 9 and 10 are the same as each other in the combination configuration of the module, but different from each other in the connection ranking of the module, the recommendation order of the recommended added module is also written differently. That is, it can be seen that in FIG. 9, an added module combination 970 is recommended first, but in FIG. 10, an added module combination 980 is recommended first.

The reason for changing the recommended source code according to the connection ranking is that the intention of the user is changed according to the connection ranking. For example, when the actuator module is first attached to the control module and the sensor is attached as illustrated in FIG. 9, the user tends to manufacture a device such as a movement means that is stopped under a specific condition by the sensor.

Alternatively, for example, as illustrated in FIG. 10, when the sensor is first attached to the control module and the actuator module is attached, the user tends to manufacture a sensor device capable of determining sensing targets at various locations while moving.

Accordingly, there is a tendency that a device to be manufactured is changed depending on a module attachment order of the user, and as a result, the inventor of the present invention configures the algorithm of the recommendation server 2 so as to recommend different source codes according to the module attachment order (connection ranking of connecting the modules to the control module) so that the users easily select the source code.

Meanwhile, a relationship between the module attachment order and the source code may be exquisitely matched by learning. For example, the relationship between the module attachment order and the source code may be mechanically learned by, for example, decision tree learning. Alternatively, machine learning is possible even by a learning method such as an artificial neural network model or SVC.

Alternatively, the recommendation server 2 may perform recommendation using the tier information and the module category. For example, when the actuator driving module is attached in tier 2, an actuator corresponding to the actuator driving module may be recommended as a module in tier 3 or a sensor module may be recommended, which is frequently used at the time of driving the actuator as a module to be added to another part in tier 2 (using the tier information). Alternatively, when a keyboard module is attached, it is also possible to recommend another input module (e.g., microphone module, etc.) to replace the keyboard module.

Alternatively, the recommendation server 2 may perform recommendation using a keyword 965. For example, when a remote controller is input as the keyword, the infrared module or a key module including a plurality of simple keys may be recommended.

Alternatively, the recommendation server 2 may also perform recommendation using the meta information. For example, when a 'fan' is stored in the module as the meta information, other modules storing the 'fan' which is the same meta information may be recommended as the additional or replaceable module. The meta information may become, for example, a detailed device name such as a fan and may be related keywords associated with the fan, such as 'breeze' or 'cool'. The meta information as module information may be stored for each module in the recommendation server 2 and meanwhile, the user is also capable of editing the module meta information by accessing the recommendation server 2. Alternatively, the meta information may be input by the machine learning.

Alternatively, the recommendation server 2 may perform recommendation by determining the recommended source code and module and the recommendation order by additionally considering the keyword 965 input by the user. For example, when the user inputs the 'remote controller', the recommendation server 2 may select a recommended module related to the remote controller among the selected source code and the additional/replaceable recommended modules based on the topology information and show the selected recommended module to the user.

Meanwhile, the recommendation server 2 may recommend the recommended source code and the additional or replaceable recommended module by searching some same components (similar components) based on the topology information even when there is no same module assembly combination history (same topology) as the current components 910 to 940 of the module assembly 1.

In this case, the recommendation server 2 may determine the module recommendation order based on the weight depending on the tier information (the distance from the control module up to the corresponding module) of the modules in the module assembly 1 in the topology information and a computation value using the weight. Further, the weight may be determined based on the module unique information. Further, when the module is attached to the semantic module, the same weight may be assigned as the case where the module is directly attached to the control module 10. For example, referring to FIG. 12, a high weight is assigned to the module 20 directly attached to the control module 10 and a lower weight than the module 20 is assigned to the subsequently attached module 30, but the same high weight as the module 20 directly attached to the control module 10 may be assigned to the modules 40 and 50 which are not directly attached to the control module 10, but attached to the semantic module 60.

For example, the recommendation server 2 may design the priority for each module category, perform a weighted sum with the weight depending on the tier information, and determine the type of module according to the weighted sum. For example, when the control module 10 which is tier 1 has a priority of 1 and a weight of 1000, the network module which is tier 3 has a priority of 2 and a weight of 100, an input module (sensor) which is tier 2 has a priority of 3 and the weight of 100, and last, an output module (actuator) which is tier 3 has a priority of 4 and a weight of 10, the weighted sum becomes 1*1000+2*100+3*100+4*10=1540 and the value may be compared with values prestored in the server and higher 10 module assembly information having a most similar number may be displayed in the order of the weighted sum and the additional or replaceable recommended module and recommended source code 950 and 960 may be displayed.

As can be known above, when the weight is appropriately used, a similar configuration may be easily found and for example, the weight may be determined by (constant (10 in the above embodiment))–(the total number of modules in the module assembly–tier value+1).

In this case, the module recommendation order may be determined through the computed weight computation value. Referring to FIG. 9, a recommended module 960 having a higher computation value may be recommended with a higher priority than a recommended module 970 having a lower computation value. The user may select any one of a plurality of replaceable/additional module combination information in the developer tool application 900. In this case, the source codes 950 and 960 corresponding to the selected module combination information may be displayed on the user terminal 3.

Further, the recommendation server 2 may additionally use keyword information 980 input by the user for recommendation. For example, when the number of recommended modules is large, the recommendation server 2 may limit the number of recommended modules by using the keyword information 980 input by the user.

Meanwhile, in the above embodiment, the computation is performed based on the topology information of the module, but frequently used modules may be registered as the module group and handled like one module. For example, the infrared sensor module, the control module, and the switch module which may receive a remote controller signal may be frequently used as one remote controller module. The module combinations may be handled as one module group.

Further, as described above, when the recommended registered module group is coupled to the main control module 10, a common connection ranking may be assigned or common tier information may be assigned. Alternatively, the main control module 10 may handle the module group as one module. In this case, each of respective modules included in the module group may acquire information of the coupled module and then the module coupled closest to the control module 10 may transmit information of the module group to the control module 10. For example, the case of FIG. 11 relates to a case where the module groups 30 and 40 are coupled to the module assembly in which the control module 10 and the module 20 are coupled to each other. In this case, the modules 30 and 40 which belong to the module group transmit and receive the module information to and from each other during coupling. In this case, the transmitted and received module information may include information of items of the topology information disclosed in FIG. 6. Further, in this case, each of the modules 10 to 40 may include the meta information. The meta information may include, for example, additional or replaceable module information or information on other modules which may constitute the module group.

In addition, when the module groups 30 and 40 are coupled to the module assembly including the control module 10, the module 30 coupled closest to the control module 10 transmits the module information to the control module 10. In this case, the control module 10 may process the module groups 30 and 40 like a single module. That is, the module groups 30 and 40 may be registered as one module.

Referring back to FIG. 4, the firmware 1049 is software for operating the module assembly 1 and when the control module 10 provides the topology information to the developer tool application included in the server or the user terminal through the Internet, the control module 10 may be recommended the source code from the recommendation server 2 on the Internet or the corresponding developer tool application and downloaded an execution file (firmware) acquired by compiling the source code selected by the user.

The microprocessor 1050 may be firmware on the module assembly 1 or a computing device for executing protocols of the communication control unit 1044 and the topology sensing unit 1043 and those skilled in the art may appropriately select and implement the microprocessor 1050 required for the module assembly 1.

Hereinafter, referring to FIG. 8, a protocol in which the control module senses the topology in the module assembly 1 will be described in detail.

In the embodiment, for simplification of description, the protocol will be described based on the module assembly 1 including connections of 3 tiers. However, those skilled in the art may perform various modifications based on the embodiment.

First, immediately after a new module, for example, a $2^{nd}$ tier module accesses the control module 10 ($1^{st}$ tier), the $2^{nd}$ tier module applies an interrupt signal to the microprocessor 1050 of the control module 10. Alternatively, for example, the control module 10 periodically sends a query to each module in order to periodically recognize the topology and each module may know whether a new module accesses the control module 10 by transmitting the lower connection module information. However, in the embodiment, it is described that since each module is a portable mobile unit by default, the interrupt signal is sent when each module is connected in order to save power.

Alternatively, a pin 180 and a pin receiving portion 160 (see FIG. 2) which selectively protrude outside the housing 11 are fabricated by a magnetic and when the protruding pin 180 is attached to the pin receiving portion 160 of another module, coupling of the protruding pin 180 and the pin receiving portion 160 may be configured to be sensed to allow the control module 10 to recognize that the new module is attached.

Alternatively, for example, when communication is performed between the modules by using a Controller Area Network (CAN) protocol, first, each module transmits the module ID as a message to declare that the corresponding module is attached when the modules are coupled. Respective modules may be connected to each other through a CAN bus and when the CAN bus is not occupied, any module (node) may also transmit the message and when two modules attempt simultaneous transmission, a message having a high priority is first transmitted according to a determined priority. In this case, the priority may be determined according to the module category. When the modules are connected to each other through CAN communication, the bus is shared, and as a result, it is advantageous in that the number of wires does not increase as compared with a point to point scheme such as UART.

Meanwhile, when interrupt occurs, the control module 10 transmits a connection check signal in order to check whether the interrupt is a normal interrupt signal and receives an acknowledgment signal (Ack) in response thereto.

When the control module 10 normally receives the acknowledgment signal (Ack), the control module 10 then queries the module ID 1046. When the module ID 1046 of a newly accessed module is received in response to the query, the corresponding module is registered in the topology information and the connection ranking is assigned to the corresponding module. Thereafter, a module distance is counted and the module weight is assigned and then information on a lower connection module is requested to the corresponding module (Connection Info).

Meanwhile, when the control module 10 receives the information on the lower connection module, the control module 10 queries the module ID to the lower connection module in order to check whether the corresponding lower connection module ($3^{rd}$ tier) is normally connected. The control module 10 checks an actual connection state by comparing the module ID received in response to the query and the lower connection module information received from the $2^{nd}$ tier module. In this case, when the connection state is different from the actual connection state, an error occurs and the control module 10 re-requests the lower connection module information to the $2^{nd}$ tier module.

When the lower connection module information received from the $2^{nd}$ tier module coincides with the actual connection state, the control module 10 registers the corresponding module in the topology information and assigns the connection ranking to the corresponding module. Thereafter, the module distance is counted and then the lower connection module information is requested to the $3^{rd}$ tier module again. In addition, the control module 10 completes the topology information by repeating the protocol until the lower connection module information disappears.

When the topology information is completed, the topology information is stored in the control module 10 and when the control module 10 is connected to the user terminal 3, the user receives a recommended source code 910 which may be ported to the module assembly 1 which is configured up to now through the developer tool application 900 installed in the user terminal 3 or provided to a web interface of the recommendation server 2.

A module recommendation system according to the present invention may provide a module recommendation system which may share assembly information of a module assembly and allow a user to be easily recommended and search required assembly information.

Further, according to the present invention, provided are a module recommendation system and a module assembly in which non-specialists which do not well know hardware or software also easily assemble the module assembly and software to be used is also automatically generated and recommended to allow anyone to easily utilize the module assembly when the module assembly is utilized for educational and personal toys, etc.

In this case, in configuring the module assembly, a system may be provided, which may rapidly fabricate a required module assembly by using information on components already assembled by the existing user and rapidly search a related source code.

Further, the user may design a new module by referring to a module assembly assembled by other user and a source code for driving the module assembly at the time of assembling the module assembly.

The above description just illustrates the technical spirit of the present invention and various changes, modifications, and substitutions can be made by those skilled in the art to which the present invention pertains without departing from an essential characteristic of the present invention.

Therefore, the embodiments and the accompanying drawings disclosed in the present invention are used to not limit but describe the technical spirit of the present invention and the scope of the technical spirit of the present invention is not limited by the embodiments and the accompanying drawings. The protective scope of the present invention should be construed based on the following claims, and all the technical concepts in the equivalent scope thereof should be construed as falling within the scope of the present invention.

The invention claimed is:

1. A source code and module recommendation system comprising:
   a module assembly including:
      a control module including a function unit,
      wherein the function unit includes a topology management unit sensing and generating topology information,
      wherein the topology management unit includes a hardware-based topology sensing unit that senses a connection state of the module assembly; and
      a plurality of other modules including a different function unit from the control module;
   a developer tool application module executed on a user terminal connected to the module assembly; and
   a recommendation server connected to the user terminal through a network, storing the topology information, and providing information on a recommended source code to the user terminal based on the topology information,
   wherein the topology information includes:
      a connection ranking collected by the control module, the connection ranking representing an order in which the plurality of other modules are connected to the control module;
      tier information, wherein the tier information is a distance from the control module to each of the plurality of other modules and is determined by counting modules connected on a shortest path from the control module up to a furthest module among the plurality of other modules; and
      lower connection module information representing module unique information of a module among the plurality of other modules having a lower tier than a corresponding module among the plurality of other modules,
   wherein the recommendation server determines the information on the recommended source code based on the topology information and transmits the determined information to the user terminal,
   wherein the information on the recommended source code is associated with a device that a user wants to assemble through the module assembly,
   wherein the topology information further includes a module category of each of the modules of the module assembly,
   wherein the module category includes:
      higher categories including setup, input and output; and
      a lower category for each of the higher categories, and
   wherein the lower category includes a control, a network, a battery, a semantic module, a sensor, a key input, a visual output, driving, an actuator and a voice output.

2. The source code and module recommendation system of claim 1,
   wherein the tier information is determined by counting modules on the shortest path from the control module of the module assembly to the corresponding module, and
   the recommendation server is configured to recommend an additional or replaceable recommended module to the module assembly based on the tier information and the module unique information.

3. The source code and module recommendation system of claim 1, wherein the topology sensing unit senses the connection state of the module assembly based on a module ID and the lower connection module information provided from a lower connection module of the control module.

4. The source code and module recommendation system of claim 1, wherein the recommendation server additionally recommends an additional or replaceable recommended module based on keyword information input from the user terminal.

5. The source code and module recommendation system of claim 1,
   wherein when the topology information is stored in the recommendation server, the recommendation server displays a source code corresponding to the topology information on the user terminal, and
   when the topology information is not stored in the recommendation server, the recommendation server recommends the source code including some of the topology information of the module assembly and an additional or replaceable module.

6. The source code and module recommendation system of claim 3, wherein the recommendation server recommends the source code and an additional or replaceable recommendation module based on meta information.

7. The source code and module recommendation system of claim 1, wherein the topology information further includes category information representing the module category including a plurality of module functions and the recommendation server recommends the source code and an additional or replaceable recommended module based on the category information.

8. The source code and module recommendation system of claim 1, wherein the recommendation server stores driving information for driving each of the plurality of other modules.

9. The source code and module recommendation system of claim 1, each of the plurality of other modules includes driving information for driving the corresponding module.

10. A module assembly configured to be connected to a user terminal connected to a recommendation server through a network, the module assembly comprising:
   a topology management unit sensing and generating topology information,
   wherein the topology management unit includes a hardware-based topology sensing unit that senses a connection state of the module assembly;
   a communication control unit;
   a memory including module information and the topology information;
   a control module including a microprocessor and including a functional unit configured to execute a program ported by the user terminal; and
   a plurality of other modules each including a different functional unit from the control module,
   wherein the topology information includes:
      a connection ranking collected by the control module, the connection ranking representing an order in which the plurality of other modules are connected to the control module;
      tier information, wherein the tier information is a distance from the control module to each of the plurality of other modules and is determined by counting modules connected on a shortest path from the control module up to a furthest module among the plurality of other modules; and lower connection module information representing module unique information of a module among the plurality of other modules having a lower tier than a corresponding module among the plurality of other modules, wherein the recommendation server determines information on a recommended source code based on the topology information and transmits the determined information to the user terminal, wherein the information on the recommended source code is associated with a device that a user wants to assemble through the module assembly, wherein the topology information further includes a module category of each of the modules of the module assembly, wherein the module category includes:
higher categories including setup, input and output; and
a lower category for each of the higher categories, and wherein the lower category includes a control, a network, a battery, a semantic module, a sensor, a key input, a visual output, driving, an actuator and a voice output.

11. The module assembly of claim 10,
wherein the tier information is determined by counting modules on the shortest path from the control module of the module assembly to the corresponding module, and wherein the recommendation server is configured to recommend an additional or replaceable recommended module to the module assembly based on the tier information and the module unique information.

12. The module assembly of claim 10, wherein the topology sensing unit senses the connection state of the module assembly based on a module ID and the lower connection module information provided from a lower connection module of the control module.

13. The module assembly of claim 10, wherein the module information includes meta information, and the recommendation server recommends the source code and an additional or replaceable recommendation module based on the meta information.

14. The module assembly of claim 10, wherein the topology information further includes category information representing the module category including a plurality of module functions, and the recommendation server recommends the source code and an additional or replaceable recommendation module based on the category information.

* * * * *